United States Patent
Vu et al.

(10) Patent No.: US 11,390,529 B2
(45) Date of Patent: Jul. 19, 2022

(54) METHOD FOR THE MANUFACTURE OF REDUCED GRAPHENE OXIDE FROM KISH GRAPHITE

(71) Applicant: ArcelorMittal, Luxembourg (LU)

(72) Inventors: Thi Tan Vu, Oviedo (ES); Maria Cabanas Corrales, Oviedo (ES); Abel Alvarez-Alvarez, Trubia-Oviedo—Asturias (ES)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 16/499,407

(22) PCT Filed: Mar. 26, 2018

(86) PCT No.: PCT/IB2018/052041
§ 371 (c)(1),
(2) Date: Sep. 30, 2019

(87) PCT Pub. No.: WO2018/178845
PCT Pub. Date: Oct. 4, 2018

(65) Prior Publication Data
US 2021/0179434 A1   Jun. 17, 2021

(30) Foreign Application Priority Data

Mar. 31, 2017   (WO) .............. PCT/IB2017/000348

(51) Int. Cl.
| | | |
|---|---|---|
| *C01B 32/198* | (2017.01) | |
| *C01B 32/194* | (2017.01) | |
| *C01B 32/23* | (2017.01) | |
| *C01B 32/19* | (2017.01) | |
| *C09K 5/10* | (2006.01) | |
| *B82Y 30/00* | (2011.01) | |
| *B82Y 40/00* | (2011.01) | |

(52) U.S. Cl.
CPC ............ *C01B 32/198* (2017.08); *C01B 32/19* (2017.08); *C01B 32/194* (2017.08); *C01B 32/23* (2017.08); *C09K 5/10* (2013.01); *B82Y 30/00* (2013.01); *B82Y 40/00* (2013.01); *C01B 2204/04* (2013.01); *C01P 2004/61* (2013.01)

(58) Field of Classification Search
CPC ....... C01B 32/19; C01B 32/23; C01B 32/194; C01B 32/198; C01B 2204/04; C01B 2204/32; B82Y 30/00; B82Y 40/00
USPC ......... 423/445 R, 460, 461; 428/98; 977/895
See application file for complete search history.

(56) References Cited

U.S. PATENT DOCUMENTS

| | | | |
|---|---|---|---|
| 1,614,352 A | | 1/1927 | Eugene |
| 3,932,596 A | * | 1/1976 | Rohatgi ............... C01B 32/215 423/448 |
| 5,672,327 A | | 9/1997 | Bennett et al. |
| 2015/0292104 A1 | | 10/2015 | Jeong et al. |
| 2015/0301039 A1 | | 10/2015 | Asenin et al. |
| 2016/0020420 A1 | * | 1/2016 | Lee ..................... H01L 51/442 136/256 |
| 2016/0096735 A1 | * | 4/2016 | Savsunenko ......... C01B 32/196 423/448 |

FOREIGN PATENT DOCUMENTS

| | | |
|---|---|---|
| CN | 102642828 A | 8/2012 |
| CN | 103910355 A | 9/2014 |
| JP | H1017313 A | 1/1998 |
| JP | 2013006909 A | 1/2013 |
| JP | 2016506448 A | 3/2016 |
| KR | 101109961 B1 | 2/2012 |
| KR | 20140017082 A * | 2/2014 |
| RU | 2527699 C1 | 9/2014 |
| TW | 201708770 A1 * | 3/2017 |
| WO | WO2011016889 A2 * | 2/2011 |
| WO | WO 2012/048068 | 4/2012 |
| WO | WO 2015145155 | 10/2015 |
| WO | 2017027731 A1 | 2/2017 |
| WO | WO 2017048711 | 3/2017 |

OTHER PUBLICATIONS

Singh "Graphene oxide: strategies for synthesis, reduction and frontier applications." RSC Adv., 2016, 6, 64993-65011 (Year: 2015).*

International Search Report of PCT/IB2018/052041, dated Jun. 21, 2018.

P.D. Laverty et al. Recovery of Flake Graphite From Steelmaking Kish, Report of Investigations/1994, RI 9512, US Department of the Interior Bureau of Mines, Int. Standard Serial No. ISSN 1066-5552, разделы Abstract, Introduction, Materials, Air Elutriation, Froth Flotation, Foam Elutriation, Chemical Purification, Acid Leaching, Evaluation of Graphite Products, Concentration Section, Leaching Section, Drying.

КравеЦ В.А., МаксИmob В.Г. Графитоулавливание и утилизация уловленной пыли, Збірник наукових працьДонНАБА, 2016(3), No. 2, разделы 1. Методы обогащения графитсодеражщей пыли и основные напралвения её утилизации; Выводы ., see machine translation Kravets.

* cited by examiner

*Primary Examiner* — Tri V Nguyen
(74) *Attorney, Agent, or Firm* — Davidson, Davidson & Kappel, LLC

(57) ABSTRACT

The present invention provides a method for the manufacture of reduced graphene oxide from Kish graphite.

26 Claims, 1 Drawing Sheet

METHOD FOR THE MANUFACTURE OF REDUCED GRAPHENE OXIDE FROM KISH GRAPHITE

The present invention relates to a method for the manufacture of reduced graphene oxide from Kish graphite. In particular, reduced graphene oxide will have applications in metal industries including steel, aluminum, stainless steel, copper, iron, copper alloys, titanium, cobalt, metal composite, nickel industries, for example as coating or as a cooling reagent.

BACKGROUND

Kish graphite is a byproduct generated in the steelmaking process, especially during the blast furnace process or iron making process. Indeed, Kish graphite is usually produced on the free surface of molten iron during its cooling. It comes from molten iron at 1300-1500° C., which is cooled at a cooling rate between 0.40° C./min and 25° C./h when transported in the torpedo car or at higher cooling rates during the ladle transfer. An extensive tonnage of Kish graphite is produced annually in a steel plant.

Since Kish graphite comprises a high amount of carbon, usually above 50% by weight, it is a good candidate to produce graphene based materials. Usually, Graphene based materials include: graphene, graphene oxide, reduced graphene oxide or nanographite.

Reduced graphene oxide is composed of one or a few layers of graphene sheets containing some oxygen functional groups. Thanks to its interesting properties such as a high thermal conductivity and a high electrical conductivity, reduced graphene oxide, being hydrophobic, has many applications as mentioned above.

Usually, Reduced graphene oxide is synthesized from kish graphite, the intermediate product being graphene oxide. The method comprises the following steps:
  the synthesis of graphene oxide from kish graphite and
  the reduction of graphene oxide to obtain the reduced graphene oxide The patent KR101109961 discloses a method of manufacturing graphene, comprising:
  a step of pretreating Kish graphite,
  a step of manufacturing graphite oxide by oxidizing the pretreated Kish graphite with an acid solution;
  a step of manufacturing graphene oxide by exfoliating the graphite oxide and
  a step of manufacturing reduced graphene oxide by reducing the graphene oxide with a reducing agent.

In this Korean patent, the pre-treatment of Kish graphite comprises: a flushing process, a process of purification using a chemical pretreatment composition and a mechanical separation process (separation by size). After the process of purification, the purified Kish graphite is separated by size, the Kish graphite having a particle size of 40 mesh or less, i.e. 420 μm or less, is kept for the manufacture of graphene oxide.

However, the pretreatment of Kish graphite comprises 2 steps using a chemical composition: the flushing step and the process of purification step. In the Example of KR101109961, the flushing step is performed with an aqueous solution comprising water, hydrochloric acid and nitric acid. Then, the process of purification is performed with a pretreatment composition comprising a chelating agent, an iron oxide remover, a surfactant, an anionic and nonionic polymer dispersant and distilled water. At industrial scale, two chemical treatments are difficult to manage since a lot of chemical waste has to be treated and the stability of such composition is difficult to control. Moreover, the pretreatment composition needs a long time preparation. The productivity is therefore slowed. Additionally, the pre-treatment of Kish graphite including the process of purification using the pretreatment composition is not environmentally friendly. Finally, in the Example, the reduction of graphene oxide into reduced graphene oxide is very long since it is performed during 24 hours.

BRIEF SUMMARY OF THE INVENTION

The purpose of the invention is to provide an easy to implement method for the manufacture of reduced graphene oxide from high purity Kish graphite. In particular, the object is to provide an environmentally friendly method to obtain reduced graphene oxide having good quality.

The present invention provides a method for the manufacture of reduced graphene oxide from kish graphite comprising:
  A. providing kish graphite,
  B. pre-treating the kish graphite comprising the following successive sub-steps:
    i. a sieving step wherein the kish graphite is classified by size as follows:
      a) Kish graphite having a size below 50 μm,
      b) Kish graphite having a size above or equal to 50 μm,
      the fraction a) of kish graphite having a size below 50 μm being removed,
    ii. a flotation step with the fraction b) of kish graphite having a size above or equal to 50 μm,
    iii. an acid leaching step wherein an acid is added so that the ratio in weight (acid amount)/(kish graphite amount) is between 0.25 and 1.0,
    iv. optionally, the kish graphite is washed and dried,
  C. oxidizing the pre-treated kish-graphite obtained after step B) in order to obtain graphene oxide and
  D. reducing the graphene oxide into reduced graphene oxide.

The following terms are defined:
Graphene oxide means one or a few layer(s) of graphene comprising at least 25% by weight of oxygen functional groups,
Reduced graphene oxide means graphene oxide that has been reduced. The reduced graphene oxide comprises one or a few layer(s) of graphene having less than 25% by weight of oxygen functional groups,
Oxygen functional groups means ketone groups, carboxyl groups, epoxy groups and hydroxyl groups and
A flotation step means a process for selectively separating Kish graphite which is hydrophobic material from hydrophilic materials.

BRIEF DESCRIPTION OF THE DRAWINGS

Other characteristics and advantages of the invention will become apparent from the following detailed description of the invention.

To illustrate the invention, various embodiments and trials of non-limiting examples will be described, particularly with reference to the following Figures.

DETAILED DESCRIPTION

Figure 1:
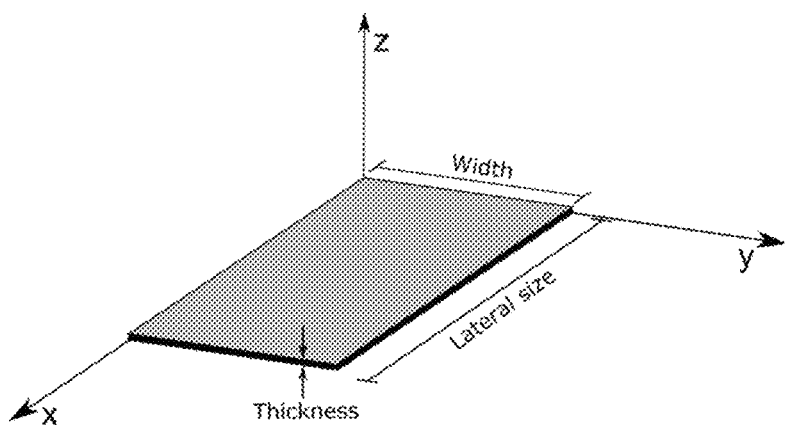
FIG. 1 illustrates an example of one layer of reduced graphene oxide according to the present invention.

The invention relates to a method for the manufacture of reduced graphene oxide from kish graphite comprising:
A. The provision of kish graphite,
B. A pre-treatment step of said kish graphite comprising the following successive sub-steps:
  i. A sieving step wherein the kish graphite is classified by size as follows:
    a) Kish graphite having a size below 50 μm,
    b) Kish graphite having a size above or equal to 50 μm,
    the fraction a) of kish graphite having a size below 50 μm being removed,
  ii. A flotation step with the fraction b) of kish graphite having a size above or equal to 50 μm,
  iii. An acid leaching step wherein an acid is added so that the ratio in weight (acid amount)/(kish graphite amount) is between 0.25 and 1.0,
  iv. Optionally, the kish graphite is washed and dried,
C. An oxidation step of the pre-treated kish-graphite obtained after step B) in order to obtain graphene oxide and
D. A reduction of graphene oxide into reduced graphene oxide.

Without willing to be bound by any theory, it seems that the method according to the present invention allows for the production of graphene oxide having good quality from high purity pre-treated Kish graphite. Indeed, the Kish graphite obtained after step B) has a purity of at least 90%. Moreover, the pre-treatment step B) is easy to implement at industrial scale and is more environmentally friendly than conventional methods.

Preferably, in step A), the Kish graphite is a residue of the steelmaking process. For example, it can be found in a blast furnace plant, in an iron making plant, in the torpedo car and during ladle transfer.

In step B.i), the sieving step can be performed with a sieving machine.

After the sieving, the fraction a) of Kish graphite having a size below 50 μm is removed. Indeed, without willing to bound by any theory, it is believed that the kish graphite having a size below 50 μm contains a very small quantity of graphite, for example less than 10%.

Preferably, in step B.ii), the flotation step is performed with a flotation reagent in an aqueous solution. For example, the flotation reagent is a further selected from among: methyl isobutyl carbinol (MIBC), pine oil, polyglycols, xylenol, S-benzyl-S'-n-butyl trithiocarbonate, S,S'-dimethyl trithiocarbonate and S-ethyl-S'-methyl trithiocarbonate. Advantageously, the flotation step is performed using a flotation device.

Preferably, in step B.i), the fraction a) of kish graphite having a size below 55 μm is removed and in step B.ii), the fraction b) of kish graphite has a size above or equal to 55 μm. More preferably, in step B.i), the fraction a) of kish graphite having a size below 60 μm is removed and wherein in step B.ii), the fraction b) of kish graphite has a size above or equal to 60 μm.

Preferably, in steps B.i) and B.ii), the fraction b) of kish graphite has a size below or equal to 300 μm, any fraction of kish graphite having a size above 300 μm being removed before step B.ii).

More preferably in steps B.i) and B.ii), the fraction b) of kish graphite has a size below or equal to 275 μm, any fraction of kish graphite having a size above 275 μm being removed before step B.ii).

Advantageously, in steps B.i) and B.ii), the fraction b) of kish graphite has a size below or equal to 250 μm, any fraction of kish graphite having a size above 250 μm being removed before step B.ii).

In step B.iii), the ratio in weight (acid amount)/(kish graphite amount) is between 0.25 and 1.0, advantageously between 0.25 and 0.9, more preferably between 0.25 and 0.8. For example, the (acid amount)/(kish graphite amount) ratio in weight is between 0.4 and 1.0, between 0.4 and 0.9 or between 0.4 and 1. Indeed, without willing to be bound by any theory, it seems that if the (acid amount)/(kish graphite amount) ratio is below the range of the present invention, there is a risk that the kish graphite comprises a lot of impurities. Moreover, it is believed that if the (acid amount)/(kish graphite amount) ratio is above the range of the present invention, there is a risk that a huge amount of chemical waste is generated.

Preferably, in step B.iii), the acid is selected among the following elements: chloride acid, phosphoric acid, sulfuric acid, nitric acid or a mixture thereof.

The pre-treated Kish graphite obtained after step B) of the method according to the present invention has a size above or equal to 50 μm. The pre-treated Kish graphite has a high purity, i.e. at least of 90%. Moreover, the degree of crystallinity is improved compared to conventional methods allowing higher thermal and electrical conductivities and therefore higher quality.

Preferably, step C) comprises the following sub-steps:
  i. The preparation of a mixture comprising the pre-treated kish-graphite, an acid and optionally sodium nitrate, the mixture being kept at a temperature below 5° C.,
  ii. The addition of an oxidizing agent into the mixture obtained in step C.i),
  iii. After the targeted level of oxidation is reached, the addition of an element to stop the oxidation reaction,
  iv. Optionally, the separation of graphite oxide from the mixture obtained in step C.iii),
  v. Optionally, the washing of the graphite oxide,
  vi. Optionally, the drying of the graphite oxide and
  vii. The exfoliation into graphene oxide.

Preferably in step Ci), the acid is selected among the following elements: chloride acid, phosphoric acid, sulfuric acid, nitric acid or a mixture thereof. In a preferred embodiment, the mixture comprises the pre-treated kish-graphite, sulfuric acid and sodium nitrate. In another preferred embodiment, the mixture comprises the pre-treated kish-graphite, sulfuric acid and phosphoric acid.

Preferably, in step C.ii), the oxidizing agent is chosen from: sodium permanganate ($KMnO_4$), $H_2O_2$, $O_3$, $H_2S_2O_5$, $H_2SO_5$, $KNO_3$, NaClO or a mixture thereof. In a preferred embodiment, the oxidizing agent is sodium permanganate.

Then, advantageously in step C.iii), the element used to stop the oxidation reaction is chosen from: an acid, non-deionized water, deionized water, $H_2O_2$ or a mixture thereof.

In a preferred embodiment, when at least two elements are used to stop the reaction, they are used successively or simultaneously. Preferably, deionized water is used to stop the reaction and then $H_2O_2$ is used to eliminate the rest of the oxidizing agent. In another preferred embodiment, hydrochloric acid is used to stop the reaction and then $H_2O_2$ is used to eliminate the rest of the oxidizing agent. In another preferred embodiment, $H_2O_2$ is used to stop the reaction and eliminate the rest of the oxidizing agent by this following reaction:

$$2KMnO_4 + H_2O_2 + 3H_2SO_4 = 2MnSO_4 + O_2 + K_2SO_4 + 4H_2O.$$

Without willing to be bound by any theory, it seems that when the element to stop the reaction is added into the mixture, there is a risk that this addition is too exothermic resulting in explosion or splashing. Thus, preferably in step C.iii), the element used to stop the reaction is slowly added into the mixture obtained in step C.ii). More preferably, the mixture obtained in step C.ii) is gradually pumped into the element used to stop the oxidation reaction. For example, the mixture obtained in step C.ii) is gradually pumped into deionized water to stop the reaction.

Optionally in step C.iv), graphite oxide is separated from the mixture obtained in step C.iii). Preferably, the graphene oxide is separated by centrifugation, by decantation or filtration.

Optionally in step C.v), graphite oxide is washed. For example, graphene oxide is washed with an element chosen from among: deionized water, non-deionized water, an acid or a mixture thereof. For example, the acid is selected among the following elements: chloride acid, phosphoric acid, sulfuric acid, nitride acid or a mixture thereof.

In a preferred embodiment, steps C.iv) and C.v) are performed successively, i.e. step C.iv) followed by step C.v). In another preferred embodiment, steps C.v) is performed before C.iv).

For example, steps C.iv) and C.v) are performed at least two times independently of each other.

Optionally in step C.vi), the graphite oxide is dried, for example with air or at high temperature in the vacuum condition.

Preferably in step C.vii), the exfoliation is performed by using ultrasound or thermal exfoliation. Preferably, the mixture obtained in step C.iii) is exfoliated into one or a few layers of graphene oxide.

After step C), Graphene oxide having an average lateral size between 5 and 50 μm, preferably between 10 and 40 μm and more preferably between 20 and 35 μm comprising at least one layer sheet is obtained.

Then, preferably, in step D), the graphene oxide is partially or completely reduced in order to obtain a reduced graphene oxide having from 0.4% to 25% by weight, more preferably from 1 to 20% of oxygen groups.

Preferably, step D) comprises the following sub-steps:
i. The reduction of graphene oxide with a reducing agent,
ii. The agitation of the mixture obtained in step D.i),
iii. Optionally, the washing of the reduced graphene oxide and
iv. Optionally, the drying of the reduced graphene oxide.

In step D.i), preferably, the reducing agent is chosen from: acid ascorbic, urea or hydrazine hydrate. More preferably, the reducing agent is acid ascorbic since the ascorbic acid is more environmentally friendly.

Advantageously, in step D.ii), the mixture is kept at a temperature between 50 and 120° C., more preferably between 60 and 95° C. and advantageously between 80 and 95° C. Preferably, the agitation is performed during less 24 hours, more preferably during less than 15 hours and advantageously during 1 to 10 hours.

By applying the method according of the present invention, the reduced graphene oxide having an average lateral size between 5 and 50 μm, preferably between 10 and 40 μm and more preferably between 20 and 35 μm comprising at least one layer sheet is obtained.

FIG. 1 illustrates an example of one layer of reduced graphene oxide according to the present invention. The lateral size means the highest length of the layer through the X axis, the thickness means the height of the layer through the Z axis and the width of the nanoplatelet is illustrated through the Y axis.

Figure 2:
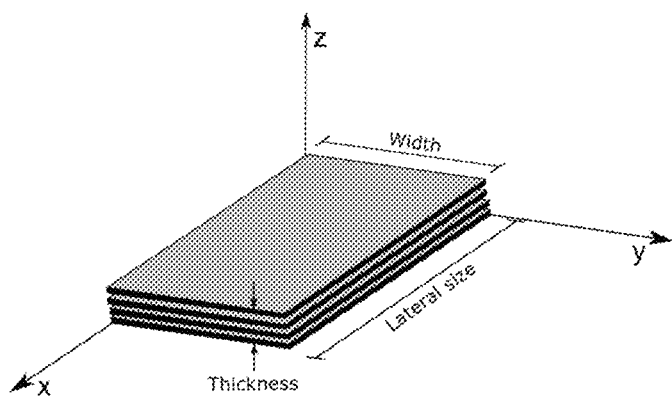
FIG. 2 illustrates an example of a few layers of reduced graphene oxide according to the present invention.

FIG. 2 illustrates an example of a few layers of reduced graphene oxide according to the present invention. The lateral size means the highest length of the layer through the X axis, the thickness means the height of the layer through the Z axis and the width of the nanoplatelet is illustrated through the Y axis.

The obtained reduced graphene oxide has good quality since it is produced from the pre-treated Kish graphite of the present invention. Moreover, the reduced graphene oxide is hydrophobic, stable at high temperature, due to the loss of most of oxygen functionalities, high thermal and electrical conductivity.

Preferably, reduced graphene oxide is deposited on metallic substrate steel to improve some properties such as corrosion resistance of a metallic substrate.

In another preferred embodiment, reduced graphene oxide is used as cooling reagent. Indeed, graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid be used to cool down a metallic substrate. For example, the metallic substrate is selected from among: aluminum, stainless steel, copper, iron, copper alloys, titanium, cobalt, metal composite, nickel.

The invention will now be explained in trials carried out for information only. They are not limiting.

EXAMPLES

Trials 1 and 2 were prepared by providing Kish graphite from steelmaking plant.

Then, Kish graphite was sieved to be classified by size as follows:
a) Kish graphite having a size below <63 μm and
b) Kish graphite having a size above or equal to 63 μm.
The fraction a) of Kish graphite having a size below 63 μm was removed.

For Trial 1, a flotation step with the fraction b) of Kish graphite having a size above or equal to 63 μm was performed. The flotation step was performed with a Humboldt Wedag flotation machine with MIBC as further. The following conditions were applied:
Cell volume (I): 2,
Rotor speed (rpm): 2000,
Solid concentration (%): 5-10,
Frother, type: MIBC,
Frother, addition (g/T): 40,
Conditioning time (s): 10 and
Water conditions: natural pH, room-temperature.

Trials 1 and 2 were then leached with the hydrochloric acid in aqueous solution. Trials were then washed with deionized water and dried in air at 90° C.

After, Trials 1 and 2 were mixed with sodium nitrate and sulfuric acid in an ice-bath. Potassium permanganate was slowly added into Trials 1 and 2. Then, mixtures were transferred into water bath and kept at 35° C. for 3 h to oxidize the Kish graphite.

After 3 hours, Trials were gradually pumped into deionized water. The temperature of mixtures was of 70° C.

After stopping the oxidation reaction, the heat was removed and around 10-15 mL of $H_2O_2$ in aqueous solution was added until there was no gas producing and mixtures were stirred 10 minutes to eliminate the rest of $H_2O_2$.

Then, Trials were exfoliated using ultrasound in order to obtain one or two layer(s) of graphene oxide. Graphene oxide of Trials 1 and 2 were separated from the mixture by centrifugation, washed with water and dried with air.

L-ascorbic acid were mixed with an aqueous solution of Trials 1 and 2. The reaction mixtures were agitated at 90° C. during 3 hours to reduce the graphene oxide sheets.

Trials 1 and 2 were then washed and dried to obtain reduced graphene oxide powder.

Trial 3 is the disclosed Example prepared according to the method of the Korean patent KR101109961.

Table 1 shows the results obtained with Trial 1 to 3.

|  | Method | Trial 1* | Trial 2 | Trial 4 (KR101109961) | |
|---|---|---|---|---|---|
| Origin of Kish graphite | | Steelmaking plant | Steelmaking plant | Steel-mill byproduct | |
| Pre-treatment of Kish graphite | Sieving step | Done, Kish graphite having a size above or equal to 63 μm kept | Done, Kish graphite having a size above or equal to 63 μm kept | Flushing step | Done with a solution of HCl and HNO3 in water |
| | Flotation step | Done | Not done | Process of purification using a Preatment composition step | Done with a preatment solution comprising EDTA salt, $Na_2SO_3$, surfactant, anionic and nonionic polymer dispersant and distilled water |
| | Acid leaching step | Done with HCl, (the acid amount)/(kish graphite amount) ratio in weight is of 0.78 | Done with HCl, (the acid amount)/(kish graphite amount) ratio in weight is of 1.26 | Mechanical separation step | Done, Kish graphite having a size below or equal to 40 mesh, i.e. 420 μm, kept |
| Pre-treated kish graphite purity | | 95.5% | 74.9% | At least 90% | |
| Oxidation step | preparation of the mixture | Done with $H_2SO_4$ and $NaNO_3$ | Done with H2SO4 and $NaNO_3$ | Done with $H_2SO_4$ and $NaNO_3$ | |
| | Addition of an oxidizing agent | $KMnO_4$ | $KMnO_4$ | $KMnO_4$ | |
| | Element to stop the reaction | Water followed by $H_2O_2$ | Water followed by $H_2O_2$ | Water followed by $H_2O_2$ | |
| | Exfoliation | Ultrasound | Ultrasound | Ultrasound | |
| Graphene oxide | | Graphene oxide having an average Lateral size from 20 to 35 μm with purity of 99.5% | Graphene oxide having an average lateral size from 20 to 35 μm with purity of 99.0% | Graphene oxide having an average size between 12 and 20.5 μm and an average thickness between 5 and 120 nm | |
| Reduction step | | Done with acid ascorbic during 3 hours | Done with acid ascorbic during 3 hours | Done with hydrazine ($N_2H_2$) during 24 hours | |
| Reduced graphene oxide | | Reduced Graphene oxide having an average Lateral size from 20 to 30 μm with purity of 99.5% and an average thickness of 1-6 nm | Reduced Graphene oxide having an average Lateral size from 20 to 30 μm with purity of 99.0% and an average thickness of 1-6 nm | Reduced Graphene oxide having an average size between 12-25 μm and an average thickness of 2-120 nm | |

*according to the present invention

The pre-treated kish-graphite obtained with Trial 1, i.e. by applying the method according to the present invention, have a higher purity compared to Trials 2 and 3. Moreover, the method of Trial 1 is more environmentally friendly than the method used for Trial 3. Finally, the reduced graphene oxide obtained with Trial 1 has a high purity and high quality.

What is claimed is:

1. A method for the manufacture of reduced graphene oxide from kish graphite comprising:
    A. providing kish graphite;
    B. pre-treating the kish graphite comprising the following successive sub-steps:
        i. a sieving step wherein the kish graphite is classified by size as follows:
            a) Kish graphite having a size below 50 μm,
            b) Kish graphite having a size greater than or equal to 50 μm,
        the fraction a) of kish graphite having a size below 50 μm being removed,
        ii. a flotation step with the fraction b) of kish graphite having a size greater than or equal to 50 μm,
        iii. an acid leaching step wherein an acid is added so that a ratio in weight (acid amount)/(kish graphite amount) is from 0.25 to 1.0,
        iv. optionally, washing and drying the kish graphite;
    C. oxidizing the pre-treated kish-graphite obtained after step B) in order to obtain graphene oxide; and
    D. reducing the graphene oxide into reduced graphene oxide.

2. The method according to claim 1, wherein in step B.i), the fraction a) of kish graphite having a size less than 55 μm is removed and in step B.ii), the fraction b) of kish graphite has a size greater than or equal to 55 μm.

3. The method according to claim 2, wherein in step B.i), the fraction a) of kish graphite having a size below 60 μm is removed and wherein in step B.ii), the fraction b) of kish graphite has a size greater than or equal to 60 μm.

4. The method according to claim 3, wherein in steps B.i) and B.ii), the fraction b) of kish graphite has a size less than or equal to 300 μm, any fraction of kish graphite having a size greater than 300 μm is removed before step B.ii).

5. The method according to claim 4, wherein in steps B.i) and B.ii), the fraction b) of kish graphite has a size less than or equal to 275 μm, any fraction of kish graphite having a size greater than 275 μm is removed before step B.ii).

6. The method according to claim 5, wherein in steps in steps B.i) and B.ii), the fraction b) of kish graphite has a size less than or equal to 250 μm, any fraction of kish graphite having a size greater than 250 μm is removed before step B.ii).

7. The method according to claim 1, wherein in step B.iii), the acid amount/kish graphite amount ratio in weight is from 0.25 to 0.9.

8. The method according to claim 7, wherein in step B.iii), the acid amount/kish graphite amount ratio in weight is from 0.25 to 0.8.

9. The method according to claim 1, wherein in step B.iii), the acid is selected from the following elements: chloride acid, phosphoric acid, sulfuric acid, nitric acid or a mixture thereof.

10. The method according to claim 1, wherein step C) comprises the following sub-steps:
   i. preparing a mixture comprising the pre-treated kish-graphite, an acid and optionally sodium nitrate, the mixture being kept at a temperature below 5° C.,
   ii. adding an oxidizing agent into the mixture obtained in step C.i),
   iii. After the targeted level of oxidation is reached, adding an element to stop the oxidation reaction,
   iv. optionally, separating graphite oxide from the mixture obtained in step C.iii),
   v. optionally, washing the graphite oxide,
   vi. optionally, drying the graphite oxide and
   vii. exfoliating into graphene oxide.

11. The method according to claim 10, wherein in step C.ii), the oxidizing agent is chosen from: sodium permanganate, $H_2O_2$, $O_3$, $H_2S_2O_8$, $H_2SO_5$, $KNO_3$, NaClO or a mixture thereof.

12. The method according to claim 10, wherein in step C.iii), the element used to stop the oxidation reaction is chosen from: an acid, non-deionized water, deionized water, $H_2O_2$ or a mixture thereof.

13. The method according to claim 12, wherein when at least two elements are chosen to stop the reaction, the at least two elements are used successively or simultaneously.

14. The method according to claim 10, wherein in step C.iii), the mixture obtained in step C.ii) is gradually pumped into the element used to stop the oxidation reaction.

15. The method according to claim 10, wherein in step C.vii), the exfoliating is performed by using ultrasound or thermal exfoliation.

16. The method according to claim 10, wherein in step C.iv), the graphene oxide is separated by centrifugation, by decantation or by filtration.

17. The method according to claim 10, wherein steps C.iv) and C.v) are performed at least two times independently of each other.

18. The method according to claim 10, wherein in step C.i), the acid is selected from the following elements: chloride acid, phosphoric acid, sulfuric acid, nitric acid or a mixture thereof.

19. The method according to claim 1, wherein step D) comprises the following sub-steps:
   i. reducing graphene oxide to reduced graphene oxide with a reducing agent by obtaining a mixture comprising the graphene oxide and the reducing agent,
   ii. agitating the mixture obtained in step D.i),
   iii. optionally, washing the reduced graphene oxide, and
   iv. optionally, drying the reduced graphene oxide.

20. The method according to claim 19, wherein in step D.i), an acid is used, and the acid is chosen from: acid ascorbic, urea or hydrazine hydrate.

21. The method according to claim 19, wherein in step D.ii), the mixture is kept at a temperature from 50 to 120° C.

22. The method according to claim 19, wherein in step D.ii), the agitation is performed during less than 24 hours.

23. The method according to claim 1, wherein the fraction a) contains less than 10% graphite.

24. The method according to claim 1, wherein the Kish graphite obtained after step B) has a purity of at least 90%.

25. The method according to claim 1, wherein the reduced graphene oxide has from 0.4% to 25% by weight of oxygen groups.

26. The method of claim 1, wherein the acid is hydrochloric acid.

* * * * *